(No Model.)

S. PRINCE.
LEMON JUICE EXTRACTOR.

No. 428,947. Patented May 27, 1890.

Witnesses
Allen Tenny.
Alonzo M. Luther.

Inventor
Samuel Prince.
By his Attorney
Frank H. Allen.

THE NORRIS PETERS CO., PHOTO-LITHO., WASHINGTON, D. C.

UNITED STATES PATENT OFFICE.

SAMUEL PRINCE, OF NEW LONDON, CONNECTICUT.

LEMON-JUICE EXTRACTOR.

SPECIFICATION forming part of Letters Patent No. 428,947, dated May 27, 1890.

Application filed November 18, 1889. Serial No. 330,665. (No model.)

*To all whom it may concern:*

Be it known that I, SAMUEL PRINCE, a citizen of the United States, residing in the city and county of New London, and State of Connecticut, have invented certain new and useful Improvements in Lemon-Juice Extractors, which improvements are fully set forth and described in the following specification, reference being had to the accompanying sheet of drawings.

This invention relates to that class of lemon-juice extractors in which a cone with abrading ribs or projections on its outer surface is used, the lemon being first cut in half and one of its sections being pressed downward onto said cone. The juice as it is pressed out runs downward on or through the cone to an inverted-cone-shaped section below, and thence through perforations to a tumbler or similar receptacle, on which the complete lemon-juice extractor rests.

The immediate object of my said invention is to improve the form and construction of such devices, to the end that the juice and pulp of the lemon may be removed without the necessity of rotating the lemon by hand on the abrading-cone, as heretofore practiced. With my improved construction it is only necessary to press the lemon down upon the cone, when the latter begins to rotate and scrapes out both the pulp and juice.

Figure 1:
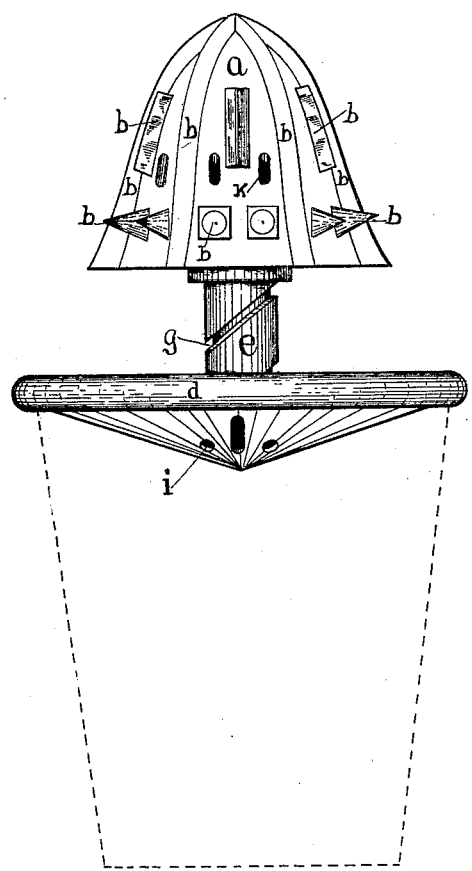
Figure 2:
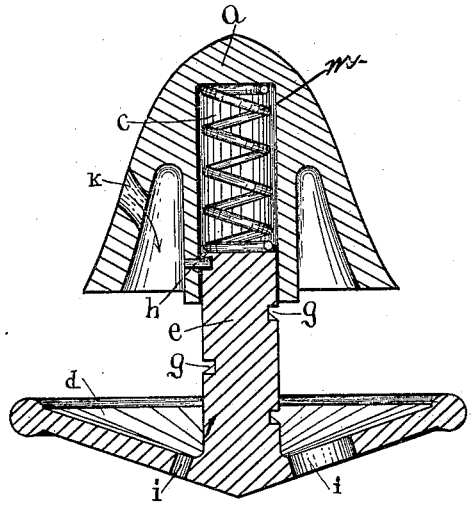
Figure 3:
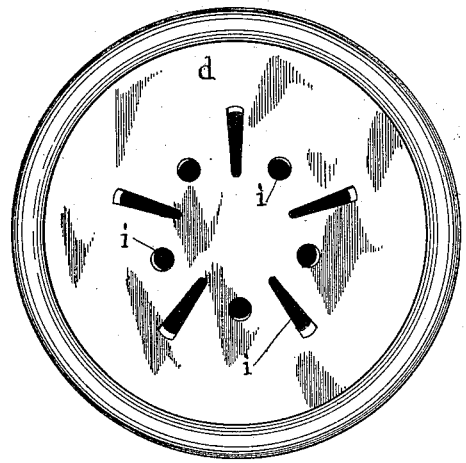

In the annexed drawings, Figure 1 is a side elevation of my improved lemon-juice extractor, and Fig. 2 a central vertical sectional view of the same. Fig. 3 is an under side view of the section of said extractor which in practice rests on a tumbler or other similar receptacle for the juice.

Referring to the drawings, the letter $a$ denotes the abrading-section formed of any suitable material, as glass or galvanized metal, the same being substantially of the shape and size of the half of a lemon and provided with ribs or projections $b$. This abrading-cone is formed with a central hole $c$.

$d$ indicates a disk, whose upper surface is depressed to form a cup, as plainly shown in Fig. 2. From the center of said cup a stud $e$ projects upward, said stud being of such size that it may fit easily in the hole $c$ of the cone above described. Stud $e$ is formed with a spiral groove $g$, into which projects (when the parts are assembled) a pin $h$, that is secured in the cone $a$. The cupped section $d$ has perforations $i$, through which the juice and pulp may pass to the tumbler or other receptacle on which said cup rests, and the cone-section $a$ may, if desired, be also perforated, as shown at $k$, Fig. 2, so that portions of the juice may pass through the shell of the cone, and thence down to the cup-section.

Assuming now that we have a juice-extractor, as described, placed over a glass, as indicated by dotted lines in Fig. 1, half of a lemon is forced downward over the abrading-cone $a$, said lemon being held firmly against rotation. Continued pressure of the lemon tends to force the cone downward, when pin $h$, working in groove $g$, causes said cone and its ribs $b$ to rotate within the lemon, thereby scraping out and reducing to juice the pulp, and also expelling the seeds, which latter drop onto and are retained by the cup $d$. To cause the cone $a$ to follow upward when the pressure of the lemon is removed, I seat a spiral spring $m$ in the hole $c$, which spring is compressed as the cone is pressed downward, and in its effort to expand raises said cone when the lemon is removed.

Having thus described my invention, I claim—

1. In combination with a cupped and perforated section having a central stud with spiral groove, as set forth, an abrading-cone with central hole to receive said central stud, and having a pin projecting into said spiral groove, all substantially as and for the purpose specified.

2. In combination with a perforated cupped disk having a central stud with spiral groove, as set forth, an abrading-cone with central hole to receive said stud, having a pin projecting into said spiral groove, and a spring seated in the cone and abutting the end of said stud, as and for the purpose specified.

SAMUEL PRINCE.

Witnesses:
MORTIMER H. BECKWITH,
GEORGE M. COLE.